United States Patent
Ganapathy et al.

(10) Patent No.: US 8,206,860 B2
(45) Date of Patent: Jun. 26, 2012

(54) METHOD TO PERFORM ADAPTIVE VOLTAGE SUPPRESSION OF A FUEL CELL STACK BASED ON STACK PARAMETERS

(75) Inventors: Sriram Ganapathy, Rochester, NY (US); John P. Salvador, Penfield, NY (US); Tayoung Choi, Rochester, NY (US); Darrell W. Burleigh, Honeoye Falls, NY (US)

(73) Assignee: GM Global Technology Operations LLC, Detroit, MI (US)

( * ) Notice: Subject to any disclaimer, the term of this patent is extended or adjusted under 35 U.S.C. 154(b) by 327 days.

(21) Appl. No.: 12/687,002

(22) Filed: Jan. 13, 2010

(65) Prior Publication Data

US 2011/0086286 A1 Apr. 14, 2011

Related U.S. Application Data

(60) Provisional application No. 61/250,450, filed on Oct. 9, 2009.

(51) Int. Cl.
*H01M 8/04* (2006.01)
(52) U.S. Cl. ........................ 429/430; 429/432; 429/452
(58) Field of Classification Search .................. 429/432, 429/430, 428, 452; 700/286, 291; 702/57, 702/63, 64
See application file for complete search history.

(56) References Cited

U.S. PATENT DOCUMENTS

| | | | |
|---|---|---|---|
| 7,745,025 B2* | 6/2010 | Leach et al. | 429/9 |
| 2005/0110464 A1* | 5/2005 | Baker | 320/134 |
| 2007/0087231 A1* | 4/2007 | Pearson | 429/9 |

* cited by examiner

*Primary Examiner* — Raymond Alejandro
(74) *Attorney, Agent, or Firm* — John A. Miller; Miller IP Group, PLC

(57) ABSTRACT

A system and method for maintaining the voltage of fuel cells in the fuel cell stack below a predetermined maximum voltage. The method determines a desired voltage set-point value that defines a predetermined maximum fuel cell voltage value and uses the voltage set-point value and an average fuel cell voltage to generate an error value there-between. The method generates a minimum gross power prediction value using the modified voltage set-point value to prevent the fuel cell voltages from going above the predetermined maximum fuel cell voltage value and generating a supplemental power value based on the minimum gross power prediction value and the error value to determine how much power needs to be drawn from the stack to maintain the fuel cell voltage below the predetermined maximum voltage value. The method uses the supplemental power value to charge the battery or operate an auxiliary load coupled to the stack.

20 Claims, 2 Drawing Sheets

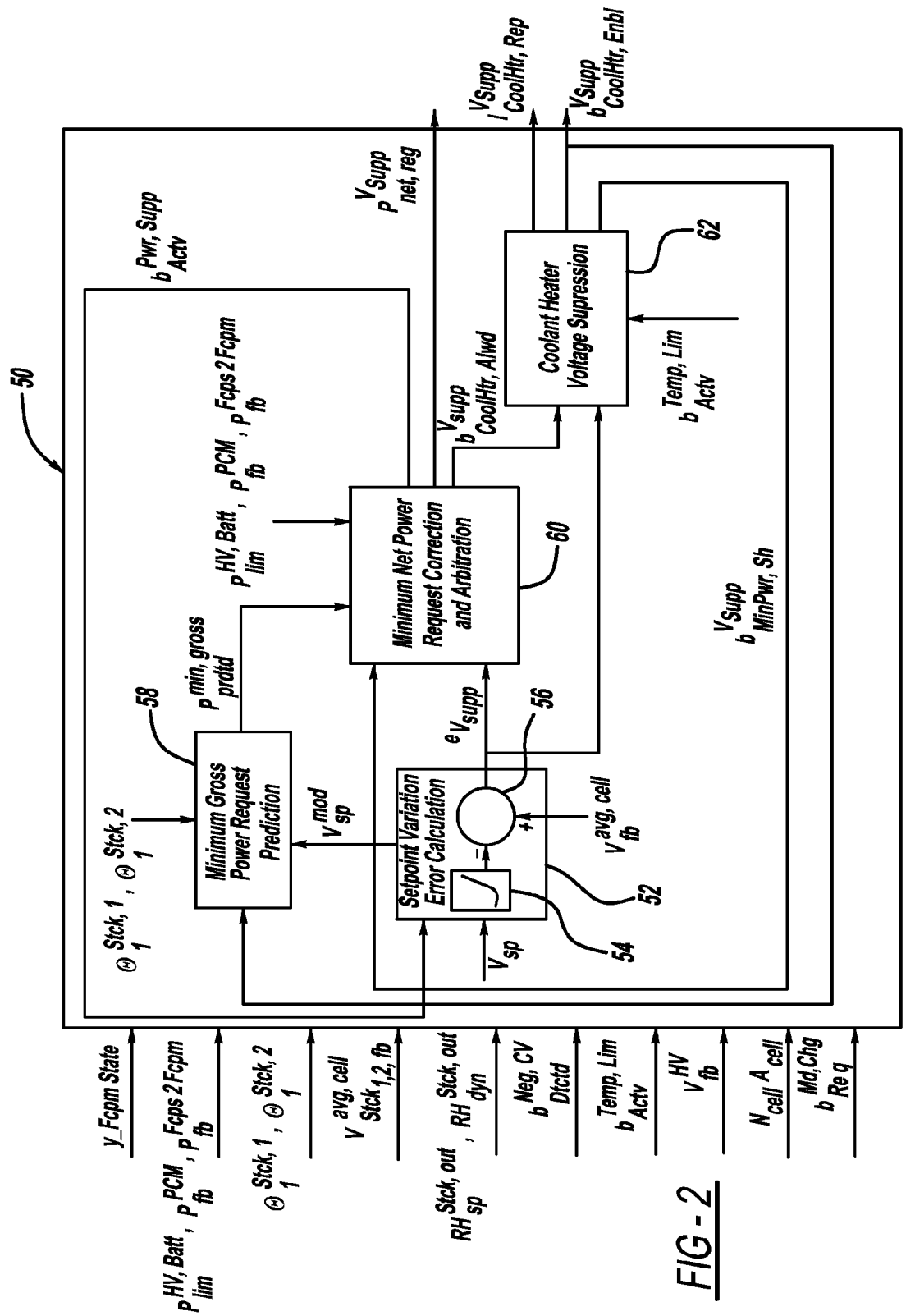

METHOD TO PERFORM ADAPTIVE
VOLTAGE SUPPRESSION OF A FUEL CELL
STACK BASED ON STACK PARAMETERS

CROSS-REFERENCE TO RELATED
APPLICATIONS

This application claims the benefit of the priority date of U.S. Provisional Patent Application Ser. No. 61/250,450, titled Method to Determine Minimum Stack Gross Power Request for Voltage Suppression Based On Stack Parameters, filed Oct. 9, 2009.

BACKGROUND OF THE INVENTION

1. Field of the Invention

This invention relates generally to a system and method for maintaining the voltage of fuel cells in a fuel cell stack below a predetermined maximum voltage threshold and, more particularly, to a system and method for maintaining the voltage of fuel cells in a fuel cell stack below a predetermined maximum voltage threshold by determining a predicted minimum gross power feed-forward term using parameters determined from a polarization curve estimation and charging a battery and/or applying an auxiliary load to the stack to reduce the average or maximum voltage measurement of the fuel cells below the maximum voltage is necessary.

2. Discussion of the Related Art

Hydrogen is a very attractive fuel because it is clean and can be used to efficiently produce electricity in a fuel cell. A hydrogen fuel cell is an electro-chemical device that includes an anode and a cathode with an electrolyte therebetween. The anode receives hydrogen gas and the cathode receives oxygen or air. The hydrogen gas is dissociated in the anode to generate free protons and electrons. The protons pass through the electrolyte to the cathode. The protons react with the oxygen and the electrons in the cathode to generate water. The electrons from the anode cannot pass through the electrolyte, and thus are directed through a load to perform work before being sent to the cathode.

Proton exchange membrane fuel cells (PEMFC) are a popular fuel cell for vehicles. The PEMFC generally includes a solid polymer electrolyte proton conducting membrane, such as a perfluorosulfonic acid membrane. The anode and cathode typically include finely divided catalytic particles, usually platinum (Pt), supported on carbon particles and mixed with an ionomer. The catalytic mixture is deposited on opposing sides of the membrane. The combination of the anode catalytic mixture, the cathode catalytic mixture and the membrane define a membrane electrode assembly (MEA). MEAs are relatively expensive to manufacture and require certain conditions for effective operation.

Several fuel cells are typically combined in a fuel cell stack to generate the desired power. For example, a typical fuel cell stack for a vehicle may have two hundred or more stacked fuel cells. The fuel cell stack receives a cathode input reactant gas, typically a flow of air forced through the stack by a compressor. Not all of the oxygen is consumed by the stack and some of the air is output as a cathode exhaust gas that may include water as a stack by-product. The fuel cell stack also receives an anode hydrogen reactant gas that flows into the anode side of the stack. The stack also includes flow channels through which a cooling fluid flows.

A fuel cell stack includes a series of bipolar plates positioned between the several MEAs in the stack, where the bipolar plates and the MEAs are positioned between the two end plates. The bipolar plates include an anode side and a cathode side for adjacent fuel cells in the stack. Anode gas flow channels are provided on the anode side of the bipolar plates that allow the anode reactant gas to flow to the respective MEA. Cathode gas flow channels are provided on the cathode side of the bipolar plates that allow the cathode reactant gas to flow to the respective MEA. One end plate includes anode gas flow channels, and the other end plate includes cathode gas flow channels. The bipolar plates and end plates are made of a conductive material, such as stainless steel or a conductive composite. The end plates conduct the electricity generated by the fuel cells out of the stack. The bipolar plates also include flow channels through which a cooling fluid flows.

It has been discovered that a typical fuel cell stack will have a voltage loss or degradation over the lifetime of the stack. It is believed that the fuel cell stack degradation is, among others, a result of voltage cycling of the fuel cells in the stack. The voltage cycling occurs when the platinum catalyst particles used to enhance the electro-chemical reaction transition between an oxidized state and a non-oxidized state, which causes dissolution of the particles. If the voltage of a fuel cell is less than about 0.9 volts, the platinum particles are not oxidized and remain a metal. When the voltage of the fuel cell goes above about 0.9 volts, the platinum crystals begin to oxidize. A low load on the stack may cause the voltage output of the fuel cell to go above 0.9 volts. The 0.9 volts corresponds to a current density of 0.2 A/cm$^2$, depending on the power density of the MEA, where a current density above this value does not change the platinum oxidation state. The oxidation voltage threshold may be different for different stacks and different catalysts.

When the platinum particles transition between a metal state and an oxidized state, oxidized ions in the platinum are able to move from the surface of the MEA towards the membrane and probably into the membrane. When the particles convert back to the metal state, they are not in a position to assist in the electro-chemical reaction, reducing the active catalyst surface and resulting in the voltage degradation of the stack.

As discussed above, voltage cycling to near stack open circuit voltage (OCV) and sustained fuel cell stack operation at or near the stack OCV causes a reduction in platinum catalyst surface area and leads to corrosion of the catalyst support. By maintaining the average cell voltage below a certain predetermined threshold, such as 900 mV, it is possible to prevent voltage degradation in the stack and improve its durability.

SUMMARY OF THE INVENTION

In accordance with the teachings of the present invention, a system and method are disclosed for maintaining the voltage of fuel cells in the fuel cell stack below a predetermined maximum voltage. The method includes modifying a desired voltage set-point value that defines a predetermined maximum fuel cell voltage value and using the modified voltage set-point value and an average fuel cell voltage feedback measurement from the fuel cells in the fuel cell stack to generate an error value there-between. The method generates a minimum gross power prediction value based on parameters of the polarization curve and the modified voltage set-point value to prevent the fuel cell voltages from going above the predetermined maximum fuel cell voltage value and generating a supplemental power value based on the minimum gross power prediction value and the error value to determine how much power needs to be drawn from the stack to maintain the fuel cell voltage below the predetermined maximum voltage value. The method uses the supplemental power value to charge the battery or operate an auxiliary load coupled to the stack.

Additional features of the present invention will become apparent from the following description and appended claims, taken in conjunction with the accompanying drawings.

BRIEF DESCRIPTION OF THE DRAWINGS

FIG. 2 is a schematic block diagram of a fuel cell system controller that suppresses the voltage of fuel cells in the fuel cell stack shown in FIG. 1.

DETAILED DESCRIPTION OF THE EMBODIMENTS

Figure 1:
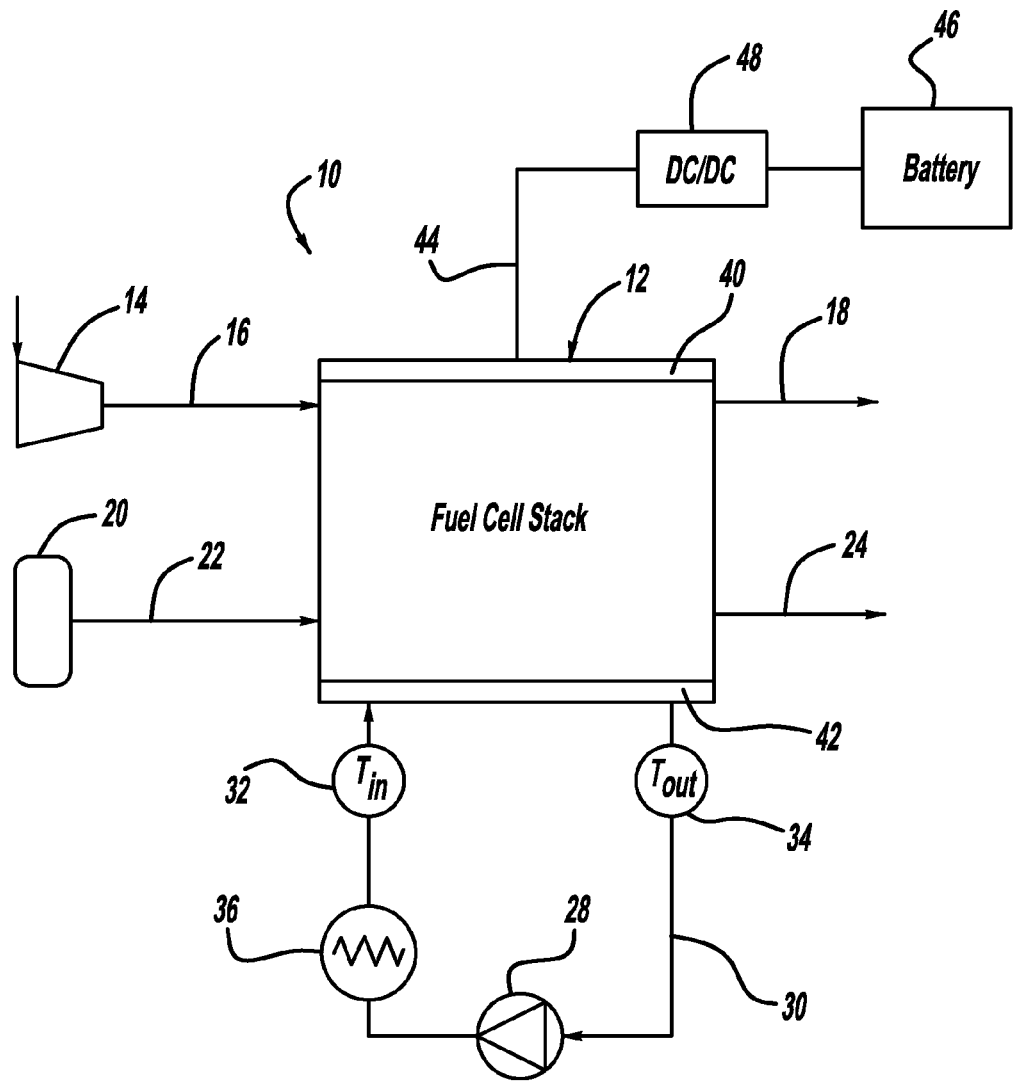
FIG. 1 is a schematic block diagram of a fuel cell system.

The following discussion of the embodiments of the invention directed to a system and method for maintaining the voltage of fuel cells in a fuel cell stack below a predetermined maximum voltage so as to reduce voltage cycling is merely exemplary in nature, and is in no way intended to limit the invention or its applications or uses. As used herein, maintaining the voltage of the fuel cells below the predetermined maximum voltage refers to any particular fuel cell, a maximum voltage fuel cell, the average of all of the fuel cells or the average of a number of fuel cells in the stack.

As will be discussed in detail below, the present invention proposes a system and method for reducing voltage cycling and degradation of a fuel cell stack. The present invention employs an algorithm that determines a minimum gross power request for maintaining the voltage of the fuel cells below a predetermined maximum voltage value using parameters determined from a stack polarization curve estimation. The algorithm reduces the minimum power request from the stack as the peak voltage decreases with fuel cell system life. Because the parameters of the stack are an indicator of the reduction in voltage, they can be used to adaptively reduce and/or modify the minimum power request for voltage suppression leading to an increase in system efficiency. The minimum power request can be arbitrated to apply to several loads, such as battery charging, cabin heating, coolant heater, compressor, etc.

The fuel cell stack controller needs to know the current/voltage relationship, referred to as a polarization curve, of the fuel cell stack to provide a proper distribution of power from the stack. The relationship between the voltage and the current of the stack is typically difficult to define because it is non-linear, and changes depending on many variables, including stack temperature, stack partial pressures and cathode and anode stoichiometries. Additionally the relationship between the stack current and voltage changes as the stack degrades over time. Particularly, an older stack will have lower cell voltages, and will need to provide more current to meet the power demands than a new, non-degraded stack. Algorithms are known in the art for calculating the polarization curve for a fuel cell stack, and modifying the polarization curve as the fuel cell stack ages, see for example U.S. Patent Application Publication No. 2008/0182139, titled Algorithm for Online Adaptive Polarization Curve Estimation of a Fuel Cell Stack, filed Jan. 31, 2007, assigned to the assignee of this application and herein incorporated by reference.

FIG. 1 is a simplified schematic plan view of a fuel cell system 10 including a fuel cell stack 12. The fuel cell stack 12 includes a cathode side that receives air from a compressor 14 on a cathode input line 16 and provides a cathode exhaust gas on a cathode exhaust gas line 18. The fuel cell stack 12 also includes an anode side that receives hydrogen gas from a hydrogen source 20, such as a high pressure tank, on an anode input line 22 and provides an anode exhaust gas on an anode exhaust gas line 24. The fuel cell stack 12 also includes end cell heaters 40 and 42 that maintain the temperature of end cells of the stack 12 at a desirable temperature for reasons that are well understood by those skilled in the art.

The system 10 further includes a thermal sub-system that provides a cooling fluid flow to the fuel cell stack 12. The thermal sub-system includes a high temperature pump 28 that pumps the cooling fluid through a coolant loop 30 external to the fuel cell stack 12 and through the cooling fluid flow channels in the bipolar plates in the fuel cell stack 12. A temperature sensor 32 measures the temperature of the cooling fluid in the coolant loop 30 as it enters the fuel cell stack 12 and a temperature sensor 34 measures the temperature of the cooling fluid in the coolant loop 30 as it exits the fuel cell stack 12. A cooling fluid heater 36 is provided in the coolant loop 30 and can be used to increase the temperature of the cooling fluid flowing through the coolant loop 30 when necessary. It can also be used as a load sink where the stack power output can be consumed by the heater for maintaining fuel cell voltage below a certain threshold. The heater 36 can be any heater suitable for the purposes described herein, such as a resistive heater.

The fuel cell stack 12 provides output power on a high voltage DC bus 44 from which power is delivered to the various high voltage devices (not shown) in the system, such as the vehicle traction motor. For a hybrid fuel cell vehicle, a high voltage battery 46 is typically provided that also is electrically coupled to the high voltage bus 44 where the fuel cell stack 12 and the battery 46 are isolated from each other by a DC/DC boost converter 48.

The voltage of each fuel cell in the fuel cell stack 12 can be modeled by:

$$E_{cell} = E_{rev} - (j+a) * R_{HFR} - \left(0.07 * \log_{10}\left(\frac{j+a}{i^0}\right) + c\log_{10}\left(1 - \frac{j}{i^\infty}\right)\right) \quad (1)$$

Where, $E_{cell}$ is the measured cell voltage (V), j is the measured stack current density (A/cm$^2$), $R_{HFR}$ is a cell high frequency resistance (HFR) measurement or a cell HFR estimation from a model (ohm·cm$^2$), $E_{rev}$ is a thermodynamic reversible cell potential (V), a is a background current density from cell shorting/cell cross-over (A/cm$^2$), i$^0$ is an exchange current density parameter (A/cm$^2$), i$^\infty$ is a limiting current density parameter (A/cm$^2$) and c is a mass transfer coefficient parameter. In equation (1), the parameters are estimated using a polarization curve estimation algorithm, as discussed above, where the parameters vary with the life of the stack.

FIG. 2 is a schematic block diagram of a control system 50 that operates an algorithm to suppress the voltage of the fuel cells in the stack 12 so that they are maintained below a predetermined maximum voltage, such as 900 mV, during low load conditions so as to minimize voltage cycling and stack degradation. As will be discussed in detail below, the system 50 receives several inputs, including, $P_{lim}^{HV,batt}$, $P_{fb}^{PCM}$, $P_{req}^{Fcps2Fcpm}$, $\theta_1^{Stck,1}$, $\theta_1^{Stck,2}$, $V_{Stck1,2,fb}^{avg,cell}$, $b_{Dtctd}^{Neg,CV}$, $b_{Actv}^{Temp,Lim}$, $V_{fb}^{HV}$, $N_{cell}$ and $A_{cell}$, to generate a minimum net power request correction and use that correction to apply a load to the stack 12 to reduce the voltage of the fuel cells in the stack 12. The definition of these values will be identified throughout the discussion. The discussion below relates to two separate fuel cell stacks coupled together in an anode flow-shifting manner, well understood to those skilled in the art. However, as will be appreciated by those skilled in the art, the algorithms and operations discussed herein have application to a single stack, such as the stack 12 in the system 10.

The system 50 includes a set-point variation and error calculation processor 52 including a ramp limiter 54 and an adder 56. The processor 52 receives a voltage set-point $V_{sp}$, which is the desired suppression voltage value, and a Boolean operation $b_{actv}^{pwr,supp}$, which indicates that voltage suppression is being provided as discussed below. The adder 56 receives the value $V_{fb}^{avg,cell}$ that is the average cell voltage value. The set-point $V_{sp}$ for the feedback based voltage suppression is varied from an initial value to a final value over a specified time period by the ramp limiter 54. This is performed so that the overall algorithm can provide a higher minimum power load on the stack 12 during down-transients to ensure that the peak voltage does not cross the maximum voltage value, and also maximize efficiency at steady-state by increasing the set-point $V_{sp}$ to a higher value. A modified voltage set-point $V_{sp}^{mod}$ from the ramp limiter 54 is compared with the average cell voltage value $V_{fb}^{avg}$ in the adder 56 to generate an error value $e_{V_{supp}}$ that will be used to correct the average cell voltage value $V_{fb}^{avg,cell}$ by the operation of the system 50 discussed below so that it is maintained below the maximum suppression voltage.

A more detailed discussion of the operation of the processor 52 for a specific non-limiting embodiment is given as follows. The voltage set-point $V_{sp}$ used for the correction and voltage suppression is set to an initial value $V_{sp}^{mod}=(V_{sp}-$ U_SuppSpInitOfst). The initial set-point $V_{sp}^{mod}$ is ramped up by the ramp limiter 54 to a final $V_{sp}^{mod}=(V_{sp}-$U_SuppSpFnlOfst) with a ramp rate of _U_SuppSpRmpRateUp when the following conditions occur, namely, the cell voltage crosses a threshold $V_{sp}^{initial}$ and voltage suppression is active either using battery charging and/or coolant heater, or any other auxiliary load, i.e., $b_{actv}^{pwr,suppl}$=TRUE.

The set-point $V_{sp}^{mod}$ is reset back to the initial set-point $V_{sp}^{initial}$ after the cell voltages go below the initial set-point $V_{sp}^{initial}$ with a ramp rate of _U_SuppSpRmpRateDown.

The modified set-point $V_{sp}^{mod}$ along with the maximum of average cell voltages ($V_{Stck1,fb}^{avg,cell}, V_{Stck2,fb}^{avg,cell}$) produces the error value $e_{V_{supp}}$ for both minimum new power correction and voltage suppression algorithms as:

$$e_{V_{supp}}=\max(V_{Stck1,fb}^{avg,cell}, V_{Stck2,fb}^{avg,cell})-V_{sp}^{mod} \quad (2)$$

The system 50 also includes a minimum gross power request prediction processor 58 that receives the modified set-point $V_{sp}^{mod}$ from the processor 52 and the stack parameters $\theta_1^{Stck,1}$ and $\theta_1^{Stck,2}$ processor 58 provides a minimum gross power feed-forward predictor $P_{prdtd}^{min,gross}$ using parameters from the polarization curve estimation algorithm. The processor 58 uses the modified set-point $V_{sp}^{mod}$ to provide to a representative current density. From the stack current density, the processor 58 determines the power level that is required from the stack 12. Using the parameters $\theta_1^{Stck,1}$ and $\theta_1^{Stck,2}$ from the polarization curve estimation and the modified set-point $V_{sp}^{mod}$ for voltage suppression, the processor 58 computes the current density required by the stack 12 to maintain the voltage at the given threshold and convert it to the feed-forward power predictor $P_{prdtd}^{min,gross}$. This value is intended to be active all the time, so that is can provide gross minimum load on the stack 12 immediately on power down-transients.

As discussed above the processor 58 determines the stack current $j_{min,stack}$ required to keep the voltage suppressed to the modified set-point $V_{sp}^{mod}$. From equation (1) and ignoring the background current density a gives:

$$E_{cell} = E_{rev} - (j+a)*R_{HFR} - \left(0.07*\log_{10}\left(\frac{j+a}{i^0}\right) + c\log_{10}\left(1-\frac{j}{i^\infty}\right)\right) \quad (3)$$

Because the stack current required for the modified voltage suppression set-point $V_{sp}^{mod}$ is very low, i.e., 0.0-0.01 A/cm², the impact of higher current density parameters for the mass transfer coefficient c, the limiting current density $i^\infty$ and the cell HFR $R_{HFR}$ can be sufficiently ignored as they only contribute to 1-2 mV at extremely low current densities. Thus, equation (3) can be written as:

$$V_{sp}^{mod} = E_{rev} - (j)*R_{HFR} - \left(0.07*\log_{10}\left(\frac{j}{i^0}\right) + c\log_{10}\left(1-\left(\frac{j}{i^\infty}\right)\right)\right) \quad (4)$$

$$V_{sp}^{mod} = E_{rev} - \left(0.07*\log_{10}\left(\frac{j_{min,stack}}{i^0}\right)\right) \quad (5)$$

The exchange current density $i^0$ is obtained from memory as a result of the polarization curve estimation. By rearranging equation (5), the current density can be determined as:

$$j_{min,stack} = 10^{\wedge}\left(\frac{E_{rev} - V_{sp}^{mod} + (0.07*\log_{10}(i^0))}{0.07}\right) \quad (6)$$

The algorithm then determines the minimum gross power value $P_{prdtd}^{min,gross}$ for the stack 12 using the modified set-point $V_{sp}^{mod}$, the current density $j_{min,stack}$, the number of cells $N_{cell}$ and the area of cells $A_{cell}$ so that the minimum gross power value $P_{prdtd}^{min,gross}$ can be determined as:

$$P_{prdtd}^{min,gross}=(j_{min,stack}*A_{cell})*(V_{sp}*N_{cell}) \quad (7)$$

A specific implementation of the operation of the processor 58 for a non-limiting embodiment for dual stacks is given below. The equations to determine the minimum gross power value $P_{prdtd}^{min,gross}$ include:

(a) determine the minimum stack current $j_{min}^{Stck,i}$ required to keep the voltage suppressed at a given set-point. For each stack, the parameter $\theta_1^{Stck}(=i^0)$ in equation (8) below is used to define the minimum current density required to keep the stack below the modified set-point $V_{sp}^{mod}$.

$$j_{min}^{Stck,i} = 10^{\wedge}\left(\frac{1.2(V_{sp}^{mod}) + \{0.07\log_{10}(\theta_1^{Stck,1})\}}{0.07}\right) \quad (8)$$

Where i=1, 2 for each stack 1 and 2, respectively.

(b) determine the minimum gross power request for the stack. Using $j_{min}^{Stck,i}$, the minimum gross power is calculated for each stack as:

$$P_{gross,min}^{Stck,1}=j_{min}^{Stck,1}*A_{cell}*V_{sp}^{mod}*N_{cell} \quad (9)$$

$$P_{gross,min}^{Stck,2}=j_{min}^{Stck,2}*A_{cell}*V_{sp}^{mod}*N_{cell} \quad (10)$$

Finally, the minimum gross power prediction request required to keep the stack below a certain threshold is given by:

$$P_{prdtd}^{min,gross}=\max(P_{gross,min}^{Stck,1}, P_{gross,min}^{Stck,2}) \quad (11)$$

This power value is bounded with calibrations _P_VoltSuppPrdtdMin and _P_VoltSuppPrdtMax and is the feed-forward term of the bias for actively controlling the stack voltage at low current densities.

The system 50 also includes a minimum net power request correction and arbitration processor 60 that receives the minimum gross power prediction value $P_{prdtd}^{min,gross}$, the values $P_{lim}^{HVBatt}$, $P_{fb}^{PCM}$ and $P_{fb}^{FCps2Fcpm}$, the error value $e_{V_{supp}}$ from the processor 52 and the Boolean operation $b_{pwr}^{V_{supp}}$, which indicates that power is being provided to an ancillary load to reduce the voltage of the stack, as discussed below. The value $P_{lim}^{HVbatt}$ is the maximum allowable power to charge the battery based on state of charge value for the battery 46, the value $P_{fb}^{PCM}$ is the sum of all ancillary and auxiliary component power feedback that act as a load on the stack and the value $P_{fb}^{FCPs2FCpm}$ is the total power requested to the fuel cell system by an external host. The processor 60 uses the predicted gross power value $P_{prdtd}^{min,gross}$, the ancillary predicted power consumption at idle and the error value $e_{V_{supp}}$ between the voltage suppression set-point $V_{sp}^{mod}$ and the average voltage feedback $V_{fb}^{avg,cell}$ to generate a minimum net power request $P_{net,req}^{V_{supp}}$ that is required to keep the stack at the predefined voltage suppression set-point $V_{sp}$.

The output $P_{net,req}^{V_{supp}}$ from the processor 60 determines how much power is needed to charge the battery 46 if the battery 46 is able to take on more charge to reduce the stack voltage. Otherwise, excess power is used to power (or load) other systems and devices. In one non-limiting embodiment, when the value $P_{net,req}^{V_{supp}}$, exceeds a certain threshold or if battery charging is not available, then a Boolean operator $b_{Cool,Hts,Alwd}^{V_{supp}}$ is set to enable an auxiliary load, such as the cooling fluid heater 36, based on the voltage suppression algorithm. The processor 60 also provides a Boolean operator $b_{actv}^{pwr,supp}$ that is sent back to the processor 52 to let it know that the suppression algorithm is providing stack voltage suppression.

The previous embodiment is a cascaded serial method of performing voltage suppression. In another embodiment, the multiple loads (battery, cooling heater, etc.) can be controlled in parallel with gains for the different controllers tuned such that the battery charging is the dominant load. This is done for efficiency gain as the energy used to charge the battery is recoverable for the vehicle.

A detailed discussion of the operation of the processor 60 is given as follows for a non-limiting embodiment for operation in the cascaded serial mode. The processor 60 has the outputs:

1. Net power request for voltage suppression $P_{net,req}^{V_{supp}}$, and
2. Boolean operator $b_{Cool,Hts,Alwd}^{V_{supp}}$ to enable the cooling fluid heater 36 based voltage suppression if the value $P_{net,req}^{V_{supp}}$ has reached a maximum threshold where sufficient battery capacity for charging is not available.

The processor 60 employs a proportional-integral (PI) controller that has the following input terms and conditions:

1. Bias term: $P_{prdtd}^{min,gross}$.
2. Error term: $e_{V_{supp}}$ (primary), 0 if _b_VoltSuppReset=TRUE OR _b_VoltSuppEnbl=FALSE.
3. Stall: if cooling fluid heater based voltage suppression is active $b_{Min,Pwr,Stl}^{V_{supp}}$=TRUE OR $b_{Actv}^{Pwr,Supp}$=TRUE AND ($e_{V_{supp}}$<0).
4. Reset: _b_VoltSuppReset; if cell voltage fall below the hysteresis threshold.

The output of the PI controller is $P_{net,raw}^{V_{supp}}$ and the final net minimum power request is given by:

$$\_P\_VoltSuppMinPrwReq=P_{net,req}^{V_{supp}}=\min(P_{net,raw}^{V_{supp}}-P_{prdt}^{Anc,idle},P_{lim}^{HV,Batt}) \quad (12)$$

Where $P_{prdt}^{Anc,idle}$ is the predicted idle load consumption of the auxiliary and ancillary components.

This is done to ensure that the algorithm does not request power higher than the battery charge limit to prevent any overstoich condition on the stack 12.

The Boolean operator $b_{CoolHtr,Alwd}^{V_{supp}}$ is set TRUE if any of the following conditions are TRUE.

1. _b_HtrAlwdMinPwrReqLimSet=TRUE if $P_{net,req}^{V_{supp}}$ has reached a maximum threshold.
2. _b_HtrAlwdHVBChrgLimSet=TRUE if the battery charging limit has been reached, i.e., $P_{net,req}^{V_{supp}}$−$P_{Lim}^{HV,Batt}$ has reached minimum threshold.

The above two conditions are sufficient and necessary to enable the cooling fluid heater based algorithm in case the battery charging limit is met or there is a minimum power request to charge the battery is not sufficient to keep cell voltages below the specified voltage set-point.

The system 50 also includes a cooling fluid heater voltage suppression processor 62 that receives the error value $e_{V_{supp}}$ from the processor 52, the Boolean operator $b_{coolHtr,Alwd}^{V_{supp}}$ from the processor 60 and the Boolean operator $b_{actv}^{temp,lim}$, which indicates that the temperature of the cooling fluid heater 36 has not been exceeded. The cooling fluid heater voltage suppression processor 62 employs an algorithm that can be used to put a load on the stack 12 to allow the cooling fluid heater 36 to reduce the voltage of the stack 12, and can be provided in combination with the battery charging discussed above or separate from the battery charging discussed above if the battery 46 is already fully charged. Further, it is noted that using the cooling fluid heater 36 as an auxiliary load to reduce the voltage of the stack 12 is just one example, where other loads in the system, such as the end cell heaters 40 and 42, the compressor 14, etc., can also be used as loads to reduce the stack voltage.

The processor 62 also close-loops on the same error value $e_{V_{supp}}$, but is enabled only under a certain set of conditions, such as the value $P_{net,req}^{V_{supp}}$ reaching an upper threshold or the battery 46 can no longer be charged. The processor 62 outputs a current request signal $I_{CoolHte,Rep}^{V_{supp}}$ to the coolant heater 36 so that it can put load on the stack 12 to suppress the voltage. The processor 62 also outputs a Boolean operator $b_{minpwr,sh}^{V_{supp}}$ to the processor 60 indicating that the amount of power that is being drawn by the cooling fluid heater 36. The processor 62 also sends the Boolean operator $b_{Pwr,stl}^{V_{supp}}$ to the minimum power request processor 58 so that it can stall the algorithm when the cooling heater voltage suppression is active. The cooling fluid heater algorithm is allowed to back off when the error value $e_{V_{supp}}$ is reduced, as both the algorithms use the input same error signal. This will allow for stability of the system and maintain priority order between the two algorithms.

A detailed discussion of the operation of the processor 62 is given below for a non-limiting embodiment. The processor 62 employs a standard PI controller that has two outputs:

1. Current request to heater I_HtrStckVoltSuppReq, and
2. Boolean operator $b_{pwr,stl}^{V_{supp}}$ to stall minimum power request algorithm if the cooling fluid heater 36 based suppression is active The minimum gross power request value $P_{prdt}^{min,gross}$ is used to determine the minimum gross power request from the stack 12. By determining the minimum gross power request from the stack 12, a number of benefits can be realized. As the peak voltage degrades with time, the stack parameters from the polarization curve estimation can track this decay and automatically reduce the minimum load required on the stack 12 to keep the voltage suppressed below a certain level. The adaptive nature of reduction in voltage suppression improves the efficiency in performance of the system by reducing the need for using loads to suppress the voltage as the stack decays with time. Further, the minimum power request would be instantaneously applied to the stack 12 during down-transients reducing the reliance on voltage feedback in real time. The traditional way of suppressing voltage would be to monitor the voltage rise during a down transient and reacting to it by activating loads to suppress it. If the minimum gross power load was predetermined using stack parameters, then the power request would already exist to prevent the voltage rise above certain thresholds, thus improving the durability of the stack 12. The algorithm described above could be extended to include closed loop on voltage feedback, where the power estimated from the stack parameters would act as a feed-forward predictor term and corrected with voltage feedback using a PI controller.

The foregoing discussion discloses and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A method for maintaining an output voltage of fuel cells in a fuel cell stack at or below a maximum voltage, said method comprising:
   modifying a desired voltage set-point value that defines a predetermined maximum fuel cell voltage value;
   determining an error value between the modified voltage set-point value and an average fuel cell voltage from the fuel cells in the fuel cell stack;
   determining a minimum gross power prediction value using the modified voltage set-point value that is used to prevent the fuel cell voltage from going above the predetermined maximum;
   determining a supplemental power value based on the minimum gross power prediction value and the error value to determine how much power needs to be drawn from the stack to maintain the fuel cell voltage below the predetermined maximum voltage value;
   charging a battery using stack power based on the supplemental power value to reduce the fuel cell voltage; and
   coupling an auxiliary load to the fuel cell stack to reduce the fuel cell voltage if a maximum battery charge limit is reached or may be reached.

2. The method according to claim 1 wherein modifying a voltage set-point value includes applying the desired voltage set-point value to a ramp limiter to vary the desired voltage set-point value from an initial voltage set-point value to the desired voltage set-point value.

3. The method according to claim 1 wherein determining a minimum gross power prediction value includes obtaining predetermined stack parameters from a memory, determining the stack current required to maintain the voltage suppressed to the modified voltage set-point value and using the stack current to determine the minimum gross power prediction value.

4. The method according to claim 3 wherein determining the minimum gross power prediction value includes using the number of fuel cells in the fuel cell stack and the area of the fuel cells in the fuel cell stack.

5. The method according to claim 4 wherein determining the minimum gross power prediction value includes using the equation:

$$P_{req}^{min,stack} = (j_{min,stack} * A_{cell}) * (V_{sp}^{mod} * N_{cell})$$

where $P_{req}^{min,stack}$ is the minimum gross power prediction value, $V_{sp}^{mod}$ is the modified voltage set-point value, $j_{min,stack}$ is the stack current density, $A_{cell}$ is the area of the fuel cell and $N_{cell}$ is the number of fuel cells.

6. The method according to claim 3 wherein obtaining stack parameters from the memory includes obtaining an exchange current density, a limiting current density and a mass transfer coefficient.

7. The method according to claim 3 wherein determining the stack current includes using the equation:

$$j_{min,stack} = 10\left(\frac{E_{rev} - V_{sp}^{mod} + (0.07 * \log_{10}(i^0))}{0.07}\right)$$

where $j_{min,stack}$ is the stack current density, $E_{rev}$ is the thermal dynamic reversible cell voltage potential and $V_{sp}^{mod}$ is the modified voltage set-point value.

8. The method according to claim 1 further comprising determining the desired voltage set-point value using a cell voltage model and a stack polarization curve.

9. The method according to claim 1 wherein determining the desired voltage set-point value includes using the equation:

$$V_{sp} = E_{rev} - \left(0.07 * \log_{10}\left(\frac{j_{min,stack}}{i^0}\right)\right)$$

where $V_{sp}$ is the voltage set-point value, $E_{rev}$ is the thermal dynamic reversible cell voltage potential, $j_{min,stack}$ is the stack current and $i^0$ is an exchange current density.

10. The method according to claim 1 wherein coupling an auxiliary load to the fuel cell stack includes coupling a cooling fluid heater that heats a cooling fluid flowing through the stack to the fuel cell stack.

11. The method according to claim 1 wherein coupling an auxiliary load to the fuel cell stack includes coupling stack end cell heaters to the fuel cell stack.

12. A method for maintaining an output voltage of fuel cells in a fuel cell stack at or below a maximum voltage, said method comprising:
   providing a desired voltage set-point value that defines a predetermined maximum fuel cell voltage value;
   modifying the desired voltage set-point value by applying the desired voltage set-point value to a ramp limiter to vary the desired voltage set-point value from an initial voltage set-point value to the desired voltage set-point value;
   determining an error value between the modified voltage set-point value and an average fuel cell voltage from the fuel cells in the fuel cell stack;
   determining a minimum gross power prediction value using the modified voltage set-point to prevent the fuel cell voltage from going above the predetermined maximum fuel cell voltage value that includes obtaining predetermined stack parameters from a memory, determining the stack current required to maintain the voltage suppressed to the modified voltage set-point value and using the stack current to determine the minimum gross power prediction value;
   determining a supplemental power value based on the minimum gross power prediction value and the error value to determine how much power needs to be drawn from the stack to maintain the fuel cell voltage below the predetermined maximum fuel cell voltage value;

charging a battery using stack power based on the supplemental power value to reduce the fuel cell voltage; and coupling an auxiliary load to the fuel cell stack to reduce the fuel cell voltage if a maximum battery charge limit is reached or may be reached.

13. The method according to claim 12 wherein determining the minimum gross power prediction value includes using the number of fuel cells in the fuel cell stack and the area of the fuel cells in the fuel cell stack.

14. The method according to claim 13 wherein determining the minimum gross power prediction value includes using the equation:

$$P_{req}^{min,stack} = (j_{min,stack} * A_{cell}) * (V_{sp}^{mod} * N_{cell})$$

where $P_{req}^{min,stack}$ is the minimum gross power prediction value, $V_{sp}^{mod}$ is the modified voltage set-point value, $j_{min,stack}$ is the stack current, $A_{cell}$ is the area of the fuel cell and $N_{cell}$ is the number of fuel cells.

15. The method according to claim 12 wherein obtaining stack parameters from the memory includes obtaining an exchange current density, a limiting current density and a mass transfer coefficient.

16. The method according to claim 12 wherein coupling an auxiliary load to the fuel cell stack includes coupling a cooling fluid heater that heats a cooling fluid flowing through the stack to the fuel cell stack.

17. The method according to claim 12 wherein coupling an auxiliary load to the fuel cell stack includes coupling stack end cell heaters to the fuel cell stack.

18. A system for maintaining an output voltage of fuel cells in a fuel cell stack at or below a maximum voltage, said system comprising:

means for determining a desired voltage set-point value using a cell voltage model and a stack polarization curve;

means for modifying the desired set-point value including increasing the desired voltage set-point value from an initial set-point value to the desired voltage set-point value;

means for generating an error value between the modified voltage set-point value and an average fuel cell voltage from the fuel cells in the fuel cell stack;

means for determining a minimum gross power prediction value using the modified voltage set-point value to prevent the fuel cell stack voltage from going above the desired set-point value;

means for determining a supplemental power value based on the minimum gross prediction value and the error value to determine how much power needs to be drawn from the stack to maintain the fuel cell voltage below the desired set-point value;

means for charging a battery using stack power based on the supplemental power value to reduce the fuel cell voltage; and means for coupling an auxiliary load to the fuel cell stack to reduce the fuel cell voltage if a maximum battery charge limit is reached or may be reached.

19. The system according to claim 18 wherein the means for determining the minimum gross power prediction value obtains predetermined stack parameters from a memory, determining the stack current required to maintain the voltage suppressed to the modified voltage set-point value and using the stack current to determine the minimum gross power prediction value.

20. The system according to claim 18 wherein the means for coupling an auxiliary load to the fuel cell stack couples a cooling fluid heater that heats a cooling fluid flowing through the stack to the fuel cell stack.

* * * * *